United States Patent [19]
Salsman

[11] Patent Number: 6,049,403
[45] Date of Patent: Apr. 11, 2000

[54] V-SPLITTER FOR OPTICAL ENGINE

[75] Inventor: Kenneth E. Salsman, Brush Prairie, Wash.

[73] Assignee: Delta America Ltd., Fremont, Calif.

[21] Appl. No.: 08/686,382

[22] Filed: Jul. 25, 1996

[51] Int. Cl.[7] .................................................. G06E 1/13
[52] U.S. Cl. .............................. 359/107; 353/98; 353/99; 350/342
[58] Field of Search .................... 359/107, 144, 359/337; 353/98, 99; 350/342

[56] References Cited

U.S. PATENT DOCUMENTS

| | | | |
|---|---|---|---|
| 2,604,813 | 7/1952 | Gretener | 353/99 |
| 3,514,198 | 5/1970 | Schacht et al. | 353/98 |
| 4,127,322 | 11/1978 | Jacobson et al. | 350/342 |
| 4,690,526 | 9/1987 | Ledebuhr | 353/99 |
| 4,974,178 | 11/1990 | Izeki et al. | 707/516 |
| 5,179,658 | 1/1993 | Izawa et al. | 345/508 |
| 5,200,843 | 4/1993 | Karasawa et al. | 353/98 |
| 5,224,085 | 6/1993 | Shinkai et al. | 369/44.33 |
| 5,404,437 | 4/1995 | Nguyen et al. | 345/302 |
| 5,448,551 | 9/1995 | Miyagawa et al. | 369/271 |
| 5,664,141 | 9/1997 | Yamamuro | 711/111 |
| 5,671,202 | 9/1997 | Brownstein et al. | 369/58 |
| 5,704,701 | 1/1998 | Kavanagh et al. | 353/98 |
| 5,772,299 | 6/1998 | Koo et al. | 353/98 |

*Primary Examiner*—Jeffery A. Hofsass
*Assistant Examiner*—John Tweel, Jr.
*Attorney, Agent, or Firm*—Skjerven, Morrill, MacPherson, Franklin & Friel LLP; David W. Held

[57] ABSTRACT

An optical engine in which full-spectrum light is split into its three primary beam components of red, blue and green, which components are then modulated by reflective or transmissive light valve structure and ultimately recombined for projection of a full color image, which engine includes a source of unmodulated full-spectrum light, and immediately optically downstream therefrom, a two-dichroic-surface V-splitter/mirror structure from which emerge the mentioned three primary beam components.

5 Claims, 2 Drawing Sheets

V-SPLITTER FOR OPTICAL ENGINE

BACKGROUND AND SUMMARY OF THE INVENTION

The present invention relates generally to tri-color image projection, and in particular concerns an improved optical-engine, input-side V-splitter for dividing a source beam of full-spectrum light into its three primary color beam components of red, blue and green.

An important object of the present invention is to provide a splitter of the type just generally outlined which offers a very simple and compact construction in a setting that efficiently results in tri-color splitting for later (downstream) image modulation.

According to a preferred embodiment of the invention, the V-splitter proposed by this invention takes the form of two relatively thin, optically clear glass plates on which appropriate dichroic layers of conventional structure have been formed, with these plates disposed in planes that are at an acute angle relative to one another and generally normal to a common third plane, with the plates being appropriately joined to one another to stabilize them against relative motion between the two. Normalizing to a common plane is convenient, but not necessary. Such is also true with respect to contacting joinder between the two plates. This preferred embodiment is illustrated herein in four different kinds of settings that can be employed in different specific modifications of an optical projection engine.

The various features and advantages that are offered by the structure of the present invention will now become more fully apparent as the description that follows is read in conjunction with the accompanying drawings.

DETAILED DESCRIPTION OF THE INVENTION

Figure 1:
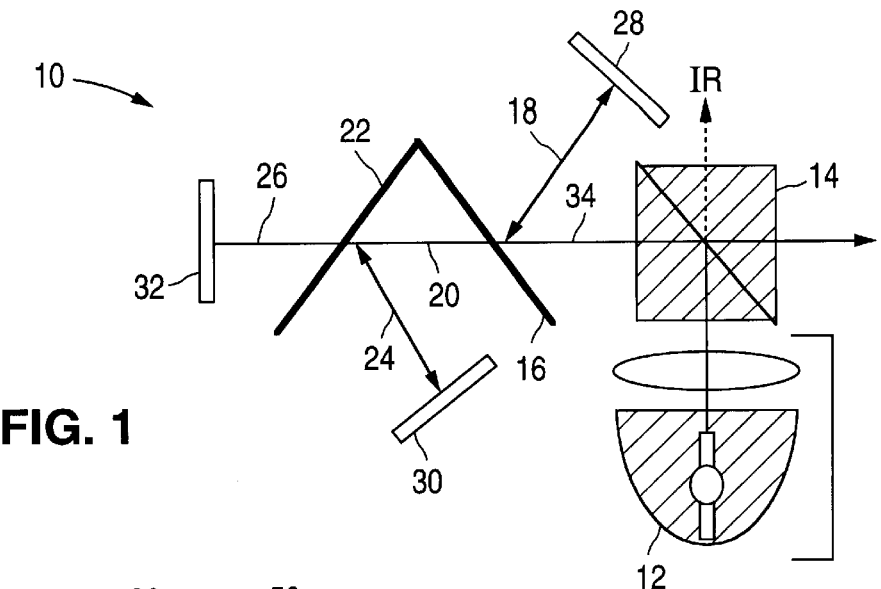
FIG. 1 is a schematic view of a preferred embodiment of the invention incorporated within an optical projection engine which employs reflective light valves.

Describing now a preferred embodiment of the invention, and turning attention first of all to FIG. 1, here there is illustrated generally at 10 an optical engine which includes a V-splitter constructed in accordance with the present invention. Included within this arrangement are a source 12 of what is referred to herein as full-spectrum (white) light which is aimed as shown at a conventional polarizing beam splitter 14. From the beam splitter, the full-spectrum beam is turned orthogonally to the left in the figure to impinge initially upon a glass plate/mirror 16 that includes a conventionally prepared dichroic layer which splits away from this beam the red component which flows along the double-ended arrow marked 18, with the blue and green other primary components passing through plate 16 as indicated by line 20. Cooperating with plate 16 is another dichroically coated plate/mirror 22 which splits away the blue beam component that flows as indicated by double-ended arrow 24 and which passes the green component as indicated by line 26.

Indicated at 28, 30, 32 are three, conventional, reflective, liquid crystal displays which reflect the red, blue, and green split beams, respectively, and which are driven, typically under computer control, by a stream of image data that relates to the red, blue, and green components of a full color image. From these light valves, the red, blue, and green components are directed back toward mirrors 16, 22 whereby they are recombined to exit the system along line 34, with the exit beam passing straight through beam splitter 14.

Mirrors 16, 22 are suitably joined to one another positioned in such a fashion that the angles of incidence of the respective beams in relation thereto are all just about or slightly under 30°, with these two plates being oriented in planes that intersect one another at an angle of around 60° with these planes being substantially normal to a common third plane which is the plane of FIG. 1.

Figure 2:
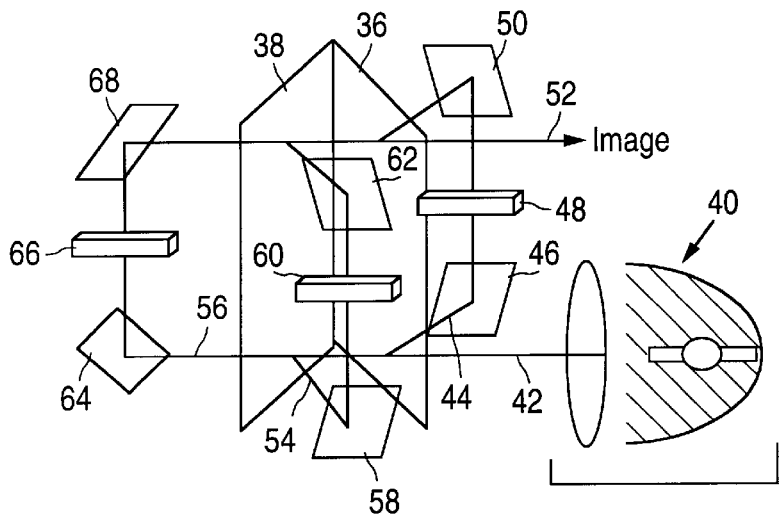
FIG. 2 is a schematic view of another embodiment of the invention illustrating an optical engine employing transmissive light valves and constructed for full-recombination within the engine of a modulated tri-color beam.

FIG. 2 illustrates a modified optical engine employing a pair of V-splitter, dichroically coated, plates/mirrors 36, 38 which are very much like previously mentioned plates/mirrors 16, 22. At the upstream side of the engine illustrated in FIG. 2 is a source 40 which creates a beam 42 of full-spectrum light that directly impinges the lower portion of the right side of plate 36 in the figure, at which point the red component of the beam is split off, as illustrated by line 44, and aimed toward a turning mirror 46 which redirects this beam component through a transmissive light valve 48. From valve 48, the beam impinges another turning mirror 50 which redirects the red beam component to the upper right side of plate 36 in the figure from where it is reflected, as indicated by line 52, to form a component of an output, combined, tri-color beam.

Going back to the location where the red beam component is split apart from the blue and green beam components, the blue and green beam components pass through plate 36 to impinge the lower underside of plate 38 in the figure, at which point the blue component is split away as indicated by line 54. The green component passes through plate 38 as indicated by line 56.

The split blue beam component impinges a turning mirror 38 which directs this beam through another transmissive light valve 60, downstream from which the beam strikes a turning mirror 62 that directs the beam toward the upper inner side of plate 38. From this location, the beam is reflected to pass through plate 36 and to join a combined tri-color output image beam indicated by line 52.

The green beam component which passes through plate 38 strikes and is turned by a turning mirror 64 which directs this beam through yet another transmissive light valve 66 to strike a second turning mirror 68. Mirror 68 aims the beam back through plates 36, 38 to join as the third, recombined, output beam from the engine.

Figure 3:
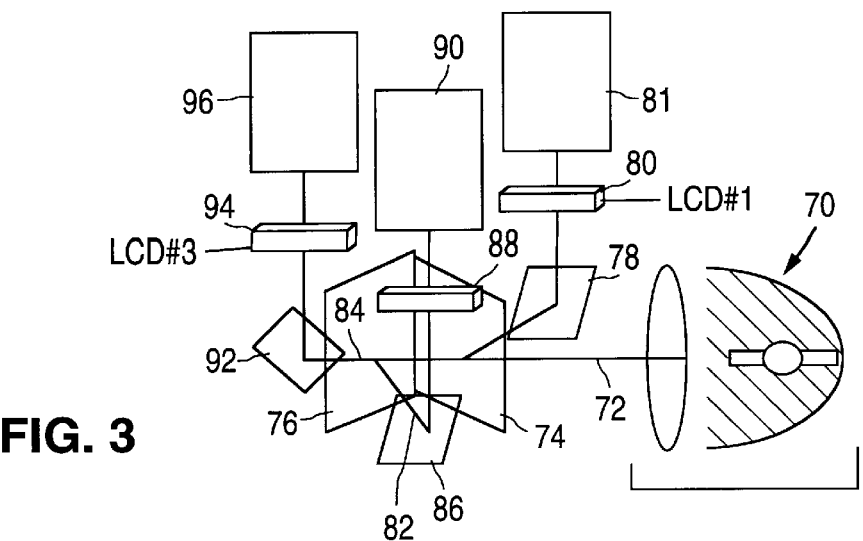
FIG. 3 is a schematic view of yet another modified form of the invention illustrating an optical projection engine employing transmissive light valves and designed to feed out of the engine three, not yet recombined, modulated tri-color beams.

Turning attention now to FIG. 3, here there is shown an optical engine including a full-spectrum light source 70 which puts out a full-spectrum beam indicated by line 72. This beam is aimed toward a V-splitter including plates/ mirrors 74, 76 which is constructed like the other two V-splitters described above. At the location of impingement of the full-spectrum beam with plate 74, the red component is split away and the blue and green components are passed through. The split away red beam component is turned by a turning mirror 78 to pass through a transmissive light valve 80, after which the beam passes through a red beam component projection lens 81.

The blue and green components which pass through plate 74 impinge plate 76, at which location the blue beam is split away, as indicated by line 82, and the green beam passes through, as indicated by line 84. The blue beam component strikes a turning mirror 86 which directs this beam through a transmissive light valve 88, and from there through a blue beam component projection lens 90.

The green beam is turned by a turning mirror 92 to pass through yet a third transmissive light valve 94 from where it passes through a green beam component projection lens 96.

Suitable conventional means and mechanism is provided for converging the three beam components from lenses 81, 90, 96 for projection onto a screen.

Figure 4:
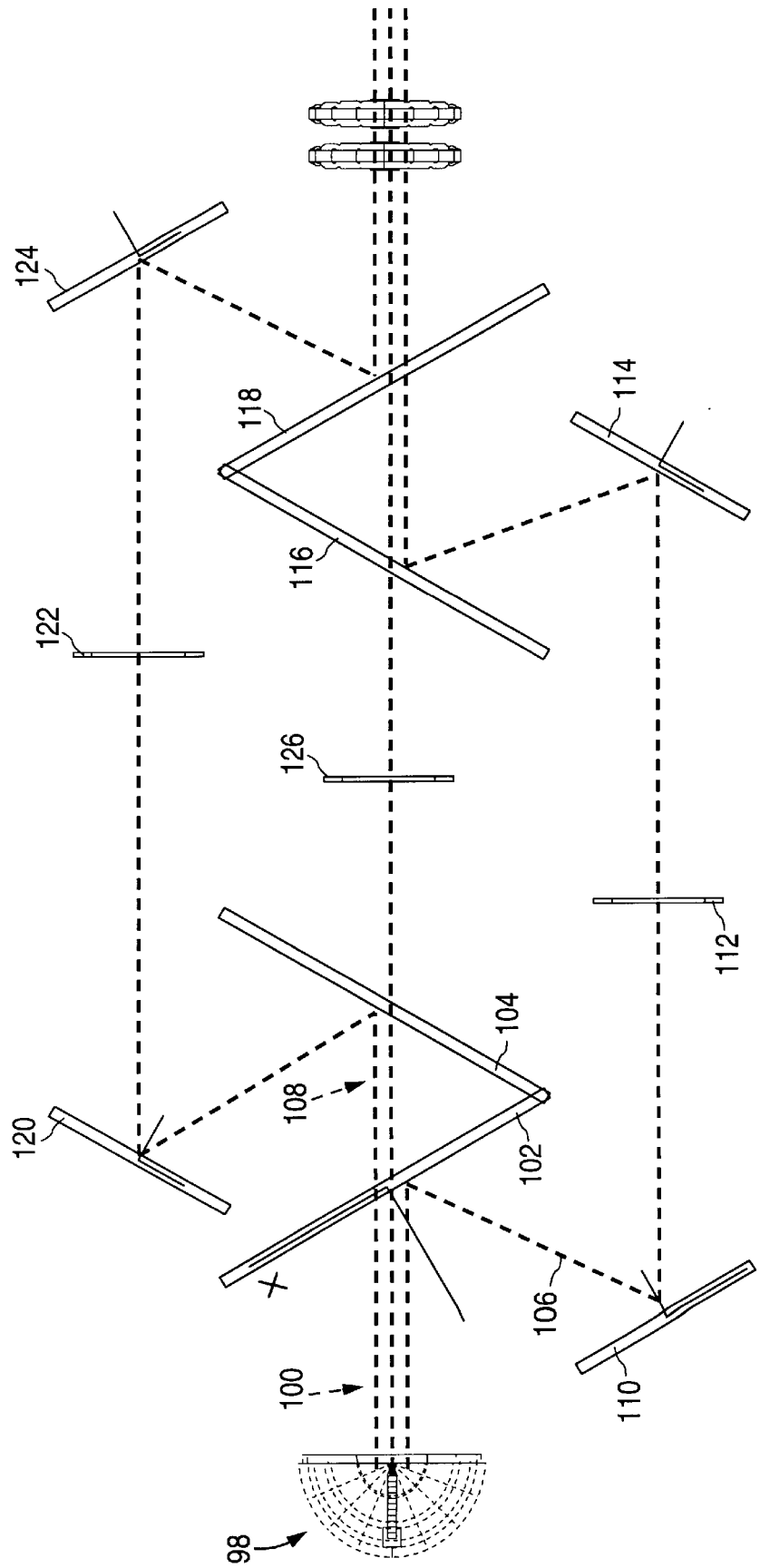
FIG. 4 is a schematic view of still another modified form of the invention illustrating an optical engine utilizing transmissive light valves in a setting where two V-organized, dichroically layered plates/mirrors are employed, with one functioning, in accordance with the invention, as a splitter, and the other functioning as an internal recombiner downstream from the splitter.

The last-to-be-described engine which employs a V-splitter constructed in accordance with the present invention is illustrated in FIG. 4. Beginning at the left side of this figure, the engine which is shown here includes a source 98 a full-spectrum light which flows as indicated by the collection of three, laterally adjacent, parallel dashed lines generally shown at 100 in the figure. This full-spectrum beam is aimed toward a V-splitter which includes a pair of dichroically layered plates/mirrors 102, 104 which are like those in the previously described V-splitters.

At the location of impingement with the full-spectrum beam of plate 102, the red beam component is split off, as indicated by line 106, and the blue and green components pass through, as indicated by lines 108 to impinge plate 104. The split away red beam component strikes a turning mirror 110 to pass through a transmissive light valve 112 and thence toward another turning mirror 114 which aims the beam at another V-like arrangement of dichroically coated plates/mirrors including plates 116, 118. The red beam strikes plate 116 from which it is reflected and passed through plate 118 to form one component of a combined tri-color output beam from the engine.

The blue and green components which pass through plate 102, at the location of impingement of plate 104, are divided, with the blue component being reflected from a turning mirror 120. From mirror 120 this beam passes through a transmissive light valve 122 to impinge another turning mirror 124 which aims the beam toward the right side of plate 118, which reflects it to the right in the figure to join as the second component in the tri-color output beam.

The green beam passes unfettered through plates 102, 104 toward a third transmissive light valve 126 from which the beam then passes, again, unfettered through plates 116, 118 to form the third beam component in the combined tri-color output beam.

Thus there has been described above and illustrated in the figures in this case, a unique V-like arrangement of dichoically coated plates/mirrors which, in a very compact fashion, accomplish splitting of a full-spectrum beam conveniently and in a very simple fashion into its three primary beam colors. As it is clearly evident from a reading of the description above along with the drawings, this compact and versatile arrangement can be organized into a very wide variety of optical engine configurations, including engine configurations which operate both with reflective and with transmissive modulating light valves.

Accordingly, while a preferred embodiment of the invention, and several modified settings therefor, have been illustrated and described herein, it is understood that other variations and modifications are possible without departing from the spirit of the invention.

It is claimed and desired to secure by Letters Patent:

1. A V-splitter/mirror structure for use in an optical engine for splitting a beam of full-spectrum light into its three primary beam components that are recombined for projection of a full color image comprising, a first V-like structure positioned to intersect the path of such a beam, said first V-like structure comprising first and second dichroically coated plates/mirrors; and a second V-like structure positioned to recombine said three primary beam components, said second V-like structure comprising third and fourth dichroically coated plates/mirrors.

2. The V-splitter/mirror structure of claim 1, wherein said first and said third dichroically coated plates/mirrors split the same primary beam component.

3. The V-splitter/mirror structure of claim 2, wherein said second and said fourth dichroically coated plates/mirrors split the same primary beam component.

4. The V-splitter/mirror structure of claim 1, wherein said first dichroically coated plate/mirror is parallel to said fourth dichroically coated plate/mirror; and said second dichroically coated plate/mirror is parallel to said third dichroically coated plate/mirror.

5. The V-splitter/mirror structure of claim 1, further comprising turning mirrors and transmissive light valves positioned to recombine said three primary beam components for projection of a full color image.

\* \* \* \* \*